(12) United States Patent
Tandon

(10) Patent No.: US 6,233,587 B1
(45) Date of Patent: May 15, 2001

(54) EXTENSIBLE FRAMEWORK OF KEY RESOURCE MANAGER AND TRANSACTION MANAGER EVENTS FOR PROVIDING NATIVE SUPPORT FOR FOREIGN-INITIATED TRANSACTIONS

(75) Inventor: Pankaj Tandon, Nashua, NH (US)

(73) Assignee: Oracle Corporation, Redwood Shores, CA (US)

(\*) Notice: Subject to any disclaimer, the term of this patent is extended or adjusted under 35 U.S.C. 154(b) by 0 days.

(21) Appl. No.: 09/074,511

(22) Filed: May 7, 1998

(51) Int. Cl.[7] .................................................. G06F 17/30
(52) U.S. Cl. ........................................... 707/103; 707/101
(58) Field of Search .................................... 707/103, 1, 8, 707/10, 2, 9, 104, 101, 102; 709/101, 104, 217, 226, 228, 229, 230, 231, 232, 240; 710/105

(56) References Cited

U.S. PATENT DOCUMENTS

| | | | |
|---|---|---|---|
| 5,363,121 | * 11/1994 | Freund | 709/101 |
| 5,390,302 | * 2/1995 | Jhonson et al. | 709/230 |
| 5,546,541 | * 8/1996 | Drew et al. | 709/240 |
| 5,729,733 | * 3/1998 | Sharif-Askary | 707/8 |
| 5,768,587 | * 6/1998 | Freund et al. | 709/101 |
| 5,835,766 | * 11/1998 | Iba et al. | 709/104 |
| 5,852,732 | * 12/1998 | Freund et al. | 709/101 |

\* cited by examiner

Primary Examiner—Hosain T. Alam
Assistant Examiner—Somjiv Shah
(74) Attorney, Agent, or Firm—Brian D. Hickman; Hickman, Palermo, Truong & Becker, LLP

(57) ABSTRACT

A method and apparatus are provided for allowing a resource manager to be more tightly integrated with foreign transaction managers with which it interacts through the use of an extensible framework of transaction and resource manager events. The tighter integration made possible by a framework in which personality modules are registered with resource managers. Each personality module corresponds to a particular foreign transaction protocol. Each personality module includes a mapping of key resource and transaction events to actions, where the action mapped to a particular event is the action required by the protocol in response to the event. When an event occurs within the resource manager, the resource manager performs the action mapped to the particular event by the appropriate personality module. For an event associated with a particular transaction, the transaction type associated with the transaction is used to select the appropriate personality manager, and the mapping within the personality manager is used to determine the appropriate action to perform. For an event associated with the resource manager, the corresponding actions in all of the registered personality modules are performed.

18 Claims, 4 Drawing Sheets

EXTENSIBLE FRAMEWORK OF KEY RESOURCE MANAGER AND TRANSACTION MANAGER EVENTS FOR PROVIDING NATIVE SUPPORT FOR FOREIGN-INITIATED TRANSACTIONS

FIELD OF THE INVENTION

The present invention relates to resource managers and, more specifically, to an extensible framework of resource and transaction manager events being used to provide native support for foreign-initiated transactions.

BACKGROUND OF THE INVENTION

A resource manager is a set of one or more processes that manage access to a resource. A database server is one example of a resource manager. A database server manages access to the data stored in a database. In typical database systems, users store, update and retrieve information from a database by submitting commands to a database server. To be correctly processed, the commands must comply with the database language that is supported by the database server. One popular database language is known as Structured Query Language (SQL). A logical unit of work that is comprised of one or more database language statements is referred to as a transaction.

To ensure the integrity of resources, resources must show all of the changes made by a transaction, or none of the changes made by the transaction. Consequently, none of the changes made by a transaction are permanently applied to a database until the transaction has been fully executed. A transaction is said to "commit" when the changes made by the transaction are made permanent to the resources affected by the transaction.

There are two general categories of transactions: local transactions and distributed transactions. A local transaction is coordinated entirely within a single resource manager. Consequently, the resource manager knows when a local transaction has been fully executed, and is able to commit local transactions without any additional information from outside of the resource manager. A local transaction therefore goes directly from an active state to a committed state when the transaction is fully executed.

A distributed transaction is not performed entirely within a single resource manager. For example, a distributed transaction may require work to be performed by two resource managers. The first resource manager may execute one portion of the work required by the distributed transaction, while the second resource manager executes another portion.

Typically, a resource manager will use a local transaction to perform the portion of a distributed transaction for which it is responsible. The same resource manager may initiate a different local transaction each time it is asked to perform work associated with a foreign transaction.

A distributed transaction is not fully executed until all work associated with the distributed transaction has been fully executed. Consequently, when a resource manager completes the execution of a portion of the distributed transaction, it does not automatically commit the local transaction(s) that performed work. Rather, the resource manager places the work in a "prepared" state. The work remains in the prepared state until the resource manager is notified about whether the work should be committed or rolled back.

For example, when its portion of the distributed transaction is fully executed, the first resource manager mentioned above cannot commit the changes made to the resource it controls until the first resource manager is informed that the other portions of the distributed transaction are fully executed. Therefore, after fully executing its portion, the first resource manager places the work in a prepared state. Similarly, the second resource manager places its work in the prepared state when the second resource manager has fully executed its portion of the distributed transaction.

A transaction manager is a set of one or more processes that is responsible for coordinating a distributed transaction. Transaction managers may be part of a resource manager, or may reside external to the resource manager. Transaction managers that reside external to a particular resource manager are referred to herein as foreign transaction managers. A transaction manager that is foreign to one resource manager may actually reside in another resource manager. Foreign transaction managers are useful for coordinating the work associated with transactions that require operations to be performed by two or more different types of resource managers.

The transaction manager for a distributed transaction coordinates the work associated with the distributed transaction by interacting with the resource managers that are responsible for performing the work. There are multiple ways to make the transaction manager aware of the work being performed by resource managers. While coordinating the work associated with a distributed transaction, the transaction manager requests status updates from the resource managers. When the transaction manager has determined that all of the resource managers have prepared their respective portions of the distributed transaction, the transaction manager informs all of the resource managers to commit their work. If any resource manager is unable to complete its portion of the distributed transaction, then the transaction manager informs all of the resource managers to roll back their work.

Communication between a foreign transaction manager and resource managers is performed through an external interface. Currently, the most common interface for transaction manager-to-resource manager communications is the XA interface described in "Distributed Transaction Processing: The XA Specification", available from X/Open Company Ltd., United Kingdom. To communicate through the XA interface, resource managers must implement certain functions dictated by the XA interface. Foreign transaction managers then interact with those resource manager by making calls to those functions.

The specific functions specified by the XA interface include:
1. Connection open
2. Transaction start
3. Transaction end
4. Transaction prepare
5. Transaction recovery
6. Transaction commit
7. Transaction rollback
8. Transaction forget
9. Connection close The use of an interface, such as the XA interface, isolates foreign transaction managers from the resource managers with whom they interact. Thus, resource managers have no concept of the nature of the distributed transactions being managed by the foreign transaction manager other than the identification of the distributed transaction, nor of the data structures maintained by the foreign transaction manager for the transactions. Rather, the resource managers map the requests that come through the interface to their own native form and structure for transactions.

For example, a transaction manager may use data structures X to manage a distributed transaction, while a resource manager uses data structures Y to manage local transactions. On the other hand, the XA interface uses a data structure Z, referred to as an xid, to identify transactions. Consequently, in every call made by the transaction manager to the resource manager for a particular transaction, the transaction manager has to map the appropriate data structure X to the data structure Z, and pass the data structure Z. In every call received from the transaction manager, the resource manager maps the received data structure Z to the appropriate corresponding data structure Y.

Similarly, in every response made by the resource manager, the resource manager has to map the appropriate data structure Y to the data structure Z. In every message received by the transaction manager from the resource manager, the transaction manager maps the received data structure Z to the appropriate data structure X.

Based on the foregoing, it is desirable to tighten the integration between foreign transaction managers and the resource managers with which they interact by providing a framework that allows native resource manager support for transactions managed by foreign transaction managers.

SUMMARY OF THE INVENTION

An extensible framework of resource and transaction manager events is provided for allowing a resource manager to be more tightly integrated with foreign transaction managers with which it interacts. The tighter integration made possible by an extensible framework in which personality modules are registered with resource managers.

Each personality module corresponds to a particular foreign transaction protocol. Each personality module includes a mapping of events to actions, where the action mapped to a particular event is the action required by the protocol in response to the event. When an event occurs within the resource manager, the resource manager performs the action mapped to the particular event by the appropriate personality module.

For an event associated with a particular transaction, the transaction type associated with the transaction is used to select the appropriate personality manager, and the mapping within the personality manager is used to determine the appropriate action to perform. For an event associated with the resource manager, the corresponding actions in all of the registered personality modules are performed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for providing native support within a resource manager for foreign-initiated transactions is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
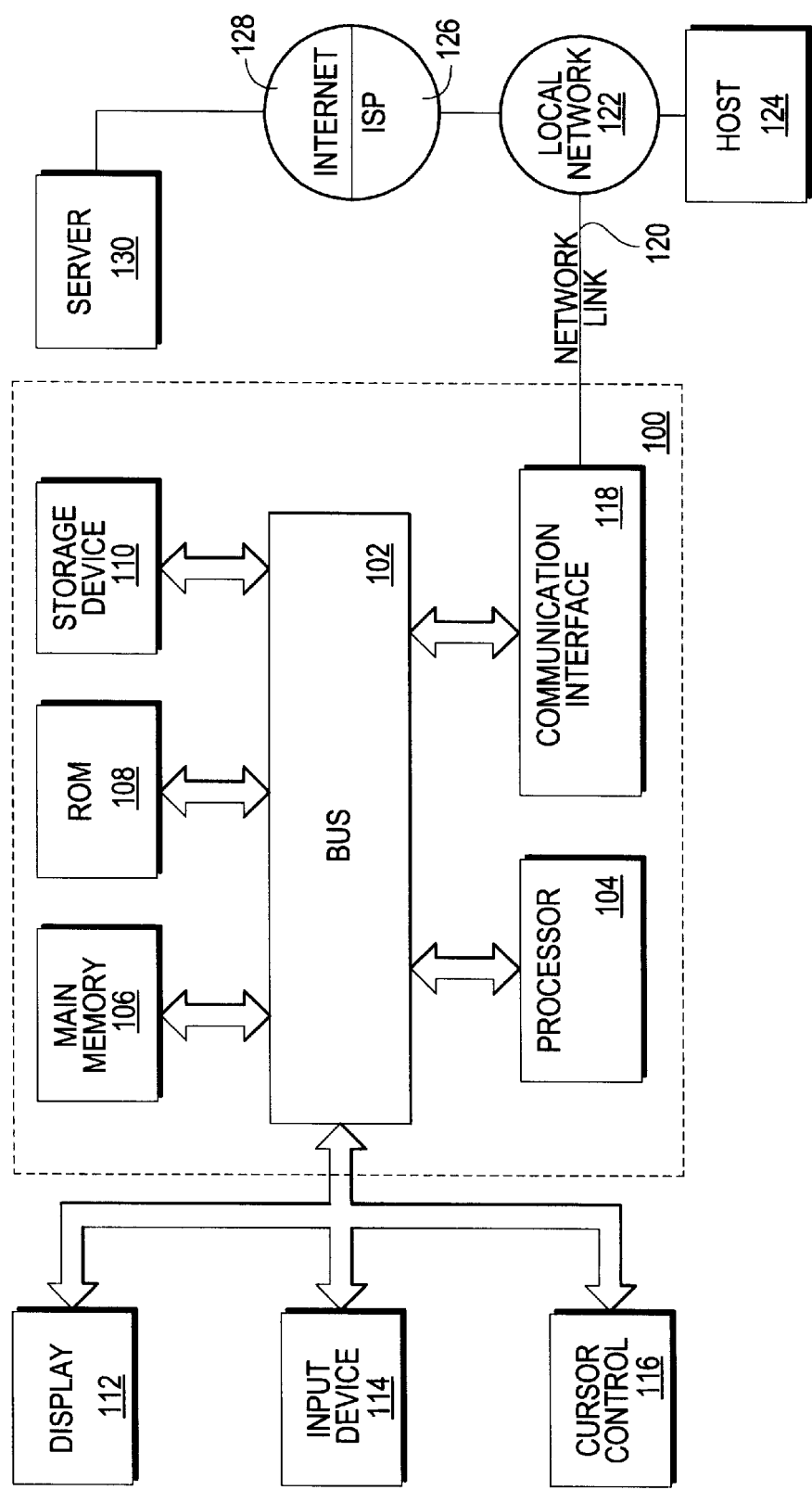
FIG. 1 is a block diagram of a computer system on which an embodiment of the invention may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for providing native support within a resource manager for foreign-initiated transactions. According to one embodiment of the invention, native support within a resource manager is provided for foreign-initiated transactions by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides native support within a resource manager for foreign-initiated transactions as described herein.

The received code may be executed by processor 104 as it is received, and/or stored in storage device 110, or other non-volatile storage for later execution. In this manner, computer system 100 may obtain application code in the form of a carrier wave.

Extensible Framework of Resource/Transaction Manager Events

Techniques are described herein for providing native support for foreign transactions using an extensible framework of key resource manager and transaction manager events. In this context, a transaction is "foreign" to a resource manager if it is a distributed transaction being coordinated by a transaction manager external to the resource manager. The support for foreign transactions is "native" in that the resource manager understands the format of transaction object associated with the transaction, may keep a "foreign" representation of the foreign transaction object for as long as necessary, and adheres to the protocol of the transaction manager that is managing the foreign transaction. Significantly, the techniques allow a resource manager to support the protocol of the foreign transaction manager even when the protocol required by the foreign transaction manager is significantly different from the protocol used by the resource manager to manage local transactions. The resource manager will undertake tasks mandated by the transaction manager's specific protocol.

Personality Modules

According to one embodiment of the invention, native support for foreign transactions is provided through the use of personality modules. A personality module is a module that maps a set of events to a set of actions. The set of events in a personality module are the "key" events in the life of a resource manager and the life of a transaction. According to one embodiment, the set of events supported by each personality module includes:

1. During resource manager start
2. On resource manager start
3. During resource manager shutdown
4. On resource manager shutdown
5. On recovery begins
6. On recovery ends
7. On transaction recovery
8. On transaction start
9. On transaction end
10. On work request
11. On transaction prepare begin
12. On transaction prepare ends
13. On transaction commit begins
14. On transaction commit ends
15. On transaction abort begins
16. On transaction abort ends
17. Before transaction send request 18. On transaction receive request 19. Before transaction send reply 20. On transaction receive reply As mentioned above, each personality module maps these events to actions. The action that is mapped to a particular event is the action required by the protocol used by the type of foreign transaction manager associated with the personality module, and will vary from personality module to personality module.

For example, a personality module for a protocol implemented by transaction managers developed by Microsoft Corporation would map the event "During resource manager start" with the action "(1) make a call through the Microsoft API to cause a transaction manager to create a resource manager cookie, and (2) receive and store a reference to the resource manager cookie". Other personality modules may require entirely different actions in response to the same event.

Not all events need be mapped to an action. For example, a particular foreign transaction protocol may not require a resource manager to take any action during resource manager start. Consequently, the personality module that implements that foreign transaction protocol will not have the "during resource manager start" event mapped to any action.

According to one embodiment, personality modules map events to actions and provide the code which, when executed by the resource manager, performs the actions. For example, personality modules may provide an event-to-action mapping for the "During resource manager start" event by providing a routine "UpcallDuringRmStart" for the resource manager to call when the "During resource manager start" event occurs. The routines provided in the personality modules may make calls to other routines in the resource manager ("inbound calls") as well as call to entities external to resource manager ("outbound calls"), such as calls to a foreign transaction manager or a foreign resource manager. Typically, communications between resource managers will be made via a foreign transaction managers. The personality module may also receive inbound calls from the transaction manager.

Personality Module Registration

According to one embodiment of the invention, one or more personality modules may be "registered" with a resource manager during startup. Upon registration, the resource manager is made aware of the event-to-action mappings contained in the resource module. Information about the registered personality modules, the mappings contained therein, and the corresponding actions, are all stored as metadata within the resource manager.

After a personality module has been registered, the resource manager is configured to provide native support for foreign transactions of the transaction type associated with the personality module. According to one embodiment of the invention, the resource manager is configured to receive commands from an administrator to "enable" and "disable" support for transaction types.

For example, assume that a personality module P1 implements routines that provide native support for a transaction type X. Once the personality module P1 is registered with a resource manager, that resource manager will provide native support for transactions of type X. However, an administrator may submit a command to disable support for type X transactions. After receiving that command, the resource manager would not make calls to the routines contained in P1 for any events. Optionally, the resource manager may continue to make calls into the routines contained in P1 for events associated with currently executing type X transactions. The administrator may re-enable support for type X transactions with a subsequent command. Once re-enabled, the resource manager would make calls to the routines contained in P1 in response to the occurrence of the appropriate events.

Exemplary System

Figure 2:
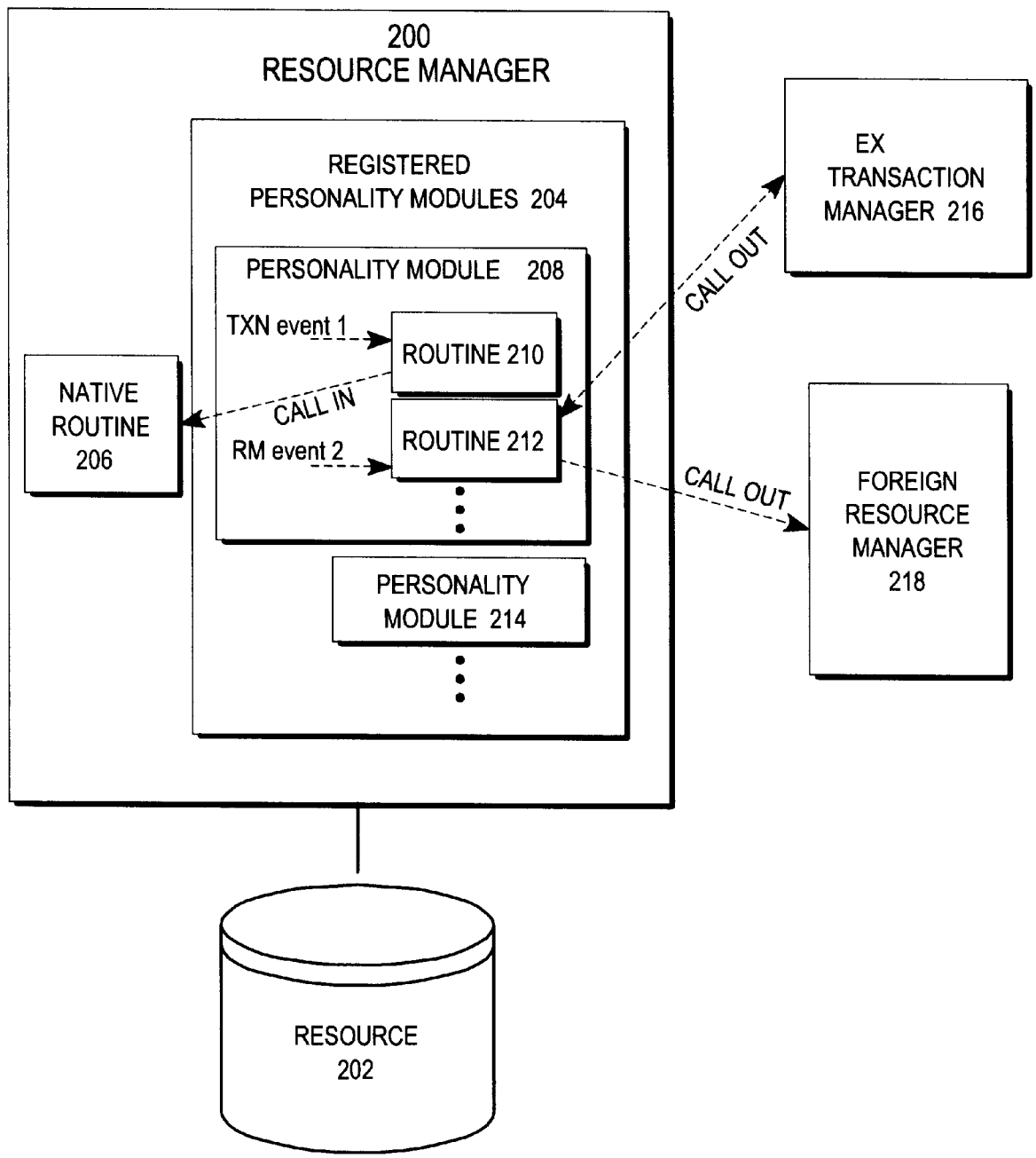
FIG. 2 is a block diagram of a system that includes a resource manager with registered personality modules according to an embodiment of the invention.

FIG. 2 is a block diagram illustrating a system that includes a resource manager 200 according to an embodiment of the invention. Resource manager 200 may be, for example, a database manager that manages access to a database (resource 202). Resource manager 200 is configured to execute local transactions by making calls to native routines, such as native routine 206. In addition, resource manager 200 is configured to register personality modules that enable resource manager 200 to provide native support for transactions initiated by foreign transaction managers, such as foreign transaction manager 216.

In the illustrated embodiment, a plurality of personality modules 204 have been registered with resource manager 200. The registered personality modules 204 include personality module 208 and personality module 214. Each personality module maps events to actions. In the illustrated embodiment, personality module 208 provides the mapping by supplying a routine for each event. When executed, the routine associated with an event causes the action associated with the event to be performed.

The actions that are mapped to an event by a personality module may include making calls to native routines (call ins) and/or to external entities (call outs). In the illustrated embodiment, routine 210 makes a call in to native routine 206, and routine 212 makes calls out to both foreign transaction manager 216 and foreign resource manager 218. Specific examples of the actions that may be performed in response to particular actions shall be described in greater detail below.

Resource Manager Events and Transaction Events

According to one embodiment of the invention, the events that are mapped to actions in the personality modules include both resource manager events and transaction events. Resource manager events are events that occur in the life of the resource manager, and are not related to any particular transaction. Such events include:

1. During resource manager start

2. On resource manager start

3. During resource manager shutdown

4. On resource manager shutdown

5. On recovery begins

6. On recovery ends

Transaction events are events in the life of a particular transaction that occur with respect to a particular resource manager. Transaction events include:

7. On transaction recovery

8. On transaction start

9. On transaction end

10. On work request

11. On transaction prepare begin

12. On transaction prepare ends

13. On transaction commit begins

14. On transaction commit ends

15. On transaction abort begins
16. On transaction abort ends
17. Before transaction send request
18. On transaction receive request
19. Before transaction send reply
20. On transaction receive reply According to one embodiment of the invention, resource manager events are handled slightly differently than transaction events. Specifically, when a resource manager event occurs, the resource manager performs the corresponding actions for all personality modules that have been registered with the resource manager. For example, assume that three personality modules P1, P2 and P3 are registered with a resource manager. When that resource manager starts, the actions associated with the "on resource manager start" event in each of the personality modules are performed.

Figure 4:
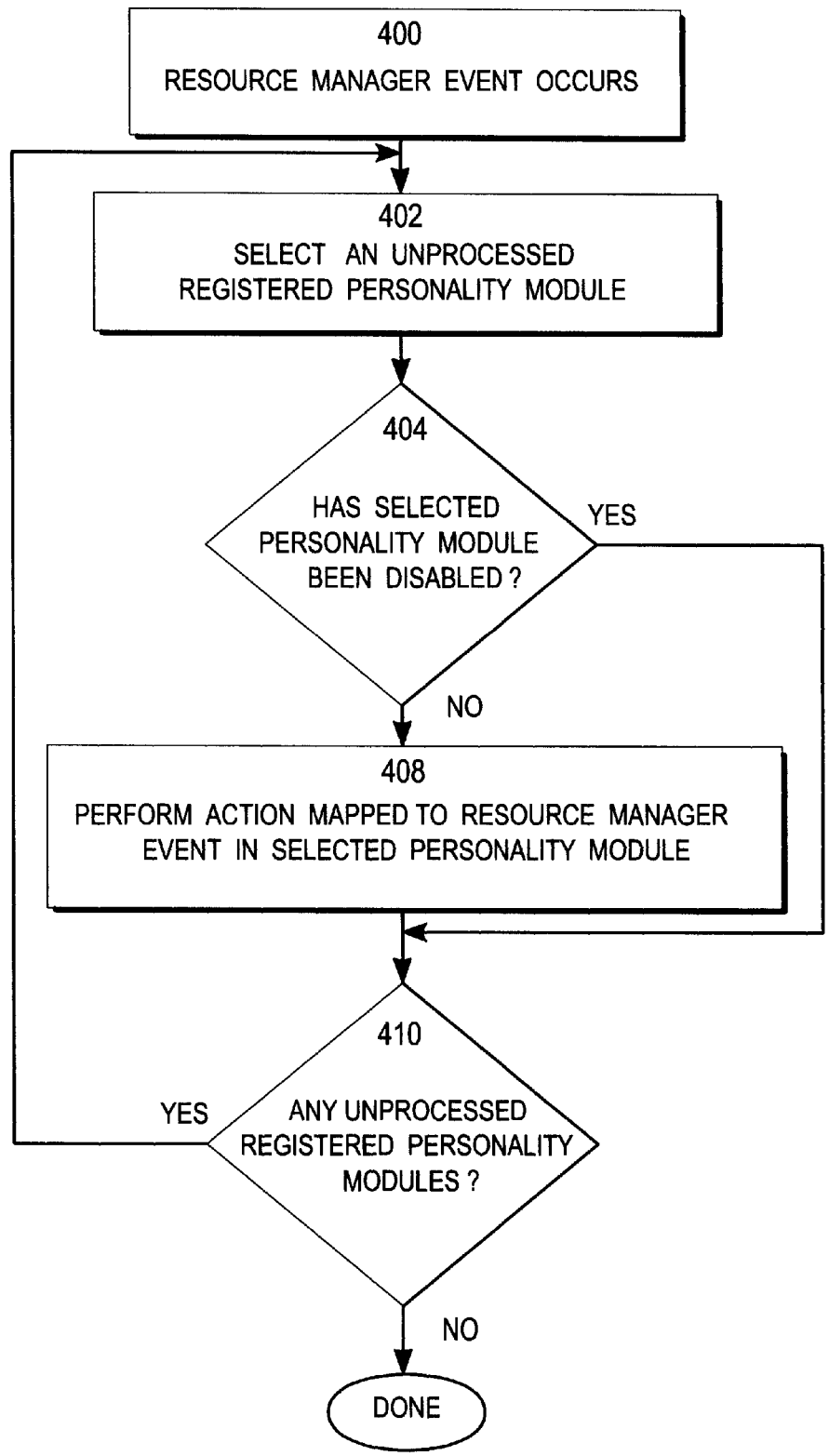
FIG. 4 is a flowchart illustrating steps for responding to a resource manager event according to an embodiment of the invention.

FIG. 4 is a flowchart that generally illustrates the steps performed when a resource manager event occurs. At step 400, the resource manager event occurs. Steps 402, 404, 408 and 410 form a loop during which each registered personality module is processed. Specifically, at step 402, and unprocessed registered personality module is selected. At step 404 it is determined whether the selected personality module has been disabled. If the selected personality module has been disabled, control proceeds to step 410. Otherwise control proceeds to step 408.

At step 408, the action that is mapped to the resource manager event in the selected personality module is performed. For example, if the selected personality module is P1 and the resource manager event is "on resource manager start", then the action mapped to "on resource manager start" in P1 is performed. Control proceeds to step 410.

At step 410, it is determined whether there remain any registered personality modules that have not yet been processed. If all registered personality modules have been processed, the resource manager event handling is complete. Otherwise, control passes back to step 402 and another registered personality module is processed.

In contrast to resource management events, when a transaction event occurs, only the action specified in the personality module associated with the foreign transaction manager type that initiated the transaction is performed. For example, assume that personality module P2 implements the protocol associated with transaction managers of type X. Assume further that a foreign transaction manager of type X initiates a distributed transaction. In response to the resource manager becoming aware of the distributed transaction, the resource manager performs the action mapped to "On transaction start" event in the P2 personality module. The actions mapped to the "On transaction start" event in the other registered personality modules P1 and P3 are not performed.

In order to perform the correct action in response to an event associated with a transaction, it is necessary to know the transaction type of the transaction. Therefore, according to one embodiment of the invention, a transaction-type attribute is established for every foreign initiated transaction.

When a local transaction is started as part of a larger foreign-initiated transaction, the transaction-type attribute of the local transaction is set to reflect the type of the foreign-initiated transaction. Consequently, when any transaction-related event occurs for that transaction, the transaction-type attribute is inspected to determine the foreign transaction type. The foreign transaction type is used to identify the corresponding personality module for the transaction. Once the appropriate personality module is determined, the resource manager performs the action that is mapped by the personality module to the transaction event that occurred.

Figure 3:
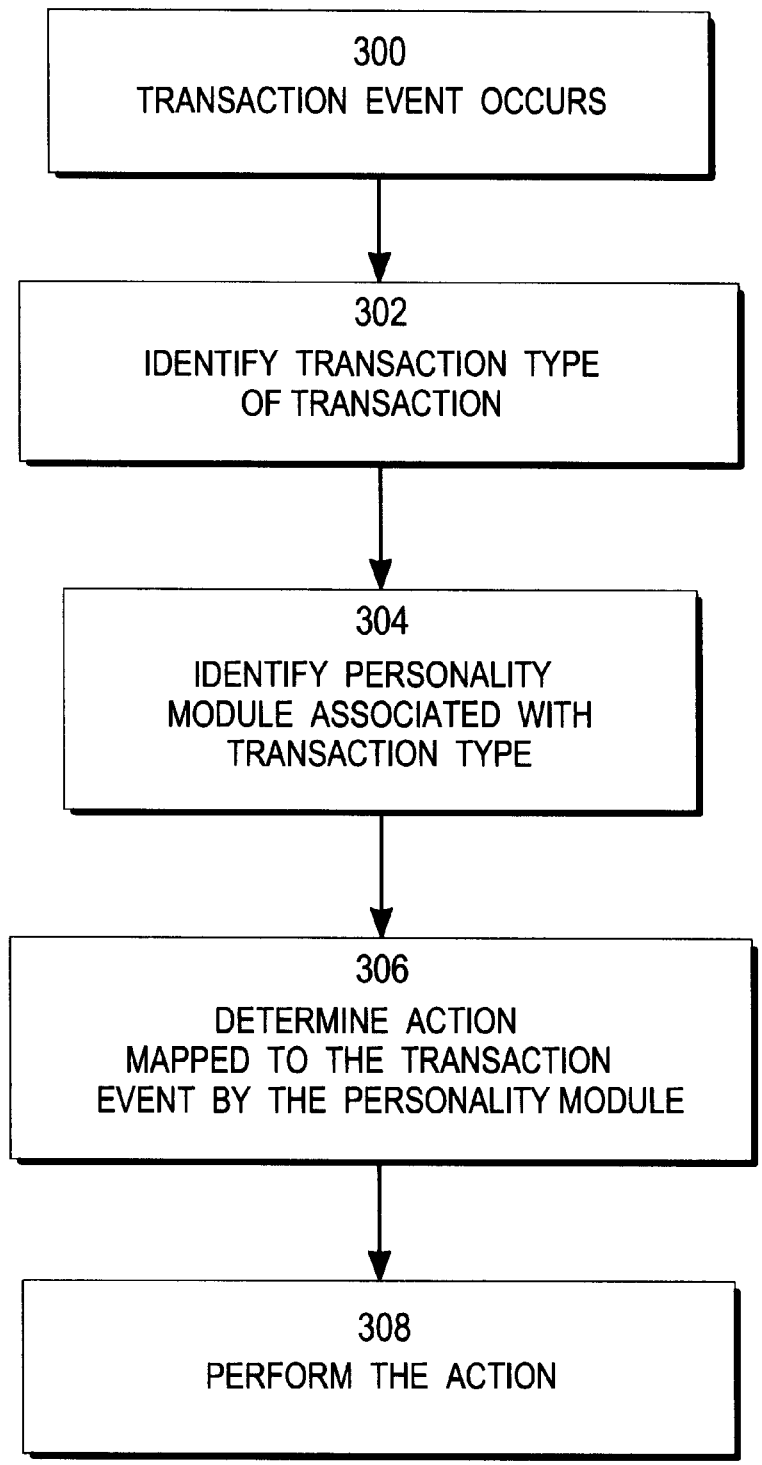
FIG. 3 is a flowchart illustrating steps for responding to a transaction event according to an embodiment of the invention.

FIG. 3 is a flowchart illustrating the steps for responding to the occurrence of a transaction event. At step 300, the transaction event occurs. At step 302, the transaction type is determined for the transaction involved in the event. At step 304, the personality module associated with the transaction type is determined. At step 306, the action that is mapped, by the personality module identified instep 304, to the transaction event that occurred is determined. At step 308 the action is performed.

Exemplary Event-To-Action Mapping

As mentioned above, the actions mapped to a particular event by a personality module will vary based on the transaction manager type associated with the personality module. However, the following are examples of the type of actions that will typically be performed in response to the various events:

1. During resource manager start—The resource manager makes a call to the foreign transaction manager to cause the foreign transaction manager to generate a resource manager "cookie". The foreign transaction manager stores the resource manager cookie, and returns a reference to the cookie back to the resource manager. To identify itself, the resource manager passes the reference to the cookie to the foreign transaction manager in all subsequent communications with the foreign transaction manager. The resource manager cookie serves to identify that particular resource manager to the foreign transaction manager, thus indicating the resource manager as the source of messages sent from the resource manager to the foreign transaction manager.

2. On resource manager start—The resource manager sends a message to the foreign transaction manager to indicate that the resource manager is now started, and to indicate entry points through which the foreign transaction manager can communicate with the resource manager.

3. During resource manager shutdown—Delete the resource manager cookie.

4. On resource manager shutdown—No action.

5. On recovery begins—Read pending transaction table. For each transaction "in doubt", execute the action associated with the "On transaction recover" event.

6. On recovery ends—Send a message to indicate that recovery is completed.

7. On transaction recovery—This event occurs, for example, when a resource manager has failed, and then has been restarted. At this point, the resource manager must recover the foreign transactions that were in progress at the time of the failure. The action associated with this event may be to send a message to the foreign transaction manager responsible for managing a particular foreign transaction to receive instructions on how to recover the foreign transaction (i.e. whether to commit or abort the foreign transaction).

8. On transaction start—This event occurs when the resource manager starts a local transaction to perform work that is part of a larger foreign-initiated transaction. Between this event and the "On transaction end" event, the resource manager actually performs the requested work. The action associated with this event may include, for example, setting the foreign transaction attribute associated with the transaction to indicate the transaction type of the foreign-initiated transaction to which the local transaction belongs. The action may also include a call to the foreign transaction manager that is managing the transaction to retrieve there-from a foreign transaction object associated with the foreign-initiated transaction. The resource manager stores data to indicate a relationship between the local transaction identifier for the local transaction and the transaction object of the foreign-initiated transaction.

9. On transaction end—No action.

10. On work request—This event occurs when a resource manager receives a request to perform work that is part of a larger foreign-initiated transaction. Typically the resource manager will respond to such a work request by initiating or otherwise associating a local transaction to do the requested work.

11. On transaction prepare begin—Acknowledge receipt of the prepare message. Get prepare information from the transaction manager that is coordinating the foreign transaction. Write the prepare information to a log.

12. On transaction prepare ends—Send a message to indicate that prepare processing is complete.

13. On transaction commit begins—Acknowledge receipt of commit request. Release locks held by committing transaction. Write log of changes made by committing transaction to disk.

14. On transaction commit ends—Send a message to the transaction manager that the transaction has been committed.

15. On transaction abort begins—Acknowledge receipt of abort request. Begin abort processing.

16. On transaction abort ends—Send message indicating that abort processing is completed.

17. Before transaction send request—This event occurs when the resource manager needs to communicate with another resource manager in order to perform some work associated with a transaction. Prior to requesting the work, the resource manager initiates an exchange of information so that the resource manager requesting the work and the resource manager receiving the work request are aware of each other. This exchange of information typically involves or is performed through the external foreign transaction manager.

18. On transaction receive request—This event occurs when a resource manager receives from another resource manager a request to perform work as part of a foreign transaction. The work request is accompanied by a foreign transaction object that identifies the transaction to which the requested work belongs. The action associated with this event may be to send a message to the foreign transaction manager that is managing the foreign transaction. The message includes the foreign transaction object, and serves to inform the foreign transaction manager that the resource manager receiving the request is now participating in the foreign transaction associated with that foreign transaction object. After receiving this message, the foreign transaction manager knows that that particular transaction will have to be rolled back on that resource manager in the case of abort processing.

19. Before transaction send reply—Determine the location of the transaction manager.

20. On transaction receive reply—Receive and unmarshall a transaction cookie. Obtain an identifier for the transaction. Import the transaction.

The actions described above are examples of those that may be required by the protocol employed by a foreign transaction manager. In addition to these actions, the resource manager may have to perform its own actions related to processing of the local transaction that is being used to perform the work associated with the foreign transaction. Thus, for example, the resource manager may actually perform numerous actions in response to a "transaction end" event, even though the appropriate personality module has not mapped any action to that event.

It should be noted that the event-action mapping specified above is merely exemplary. The present invention is not limited to any particular set of events, nor any particular event-to-action mapping. The actual events that trigger a resource manager to perform action required by a foreign transaction protocol will vary from protocol to protocol. However, using the personality modules atop the transaction and resource manager key event framework described herein, a resource manager can be enabled to provide native support for numerous types of foreign transaction protocols without significantly increasing the complexity of the resource manager itself.

Using the techniques described herein, transaction managers and resource managers can be significantly more integrated than is possible when interaction is limited to that provided by generic interfaces, such as the XA interface. Further, a separate personality module (an "XA-personality module") may be provided to support the protocol used by XA-compliant transaction managers. Thus, a single resource manager may use the personality module framework described herein to concurrently provide support for XA transactions and non-XA types of foreign transactions.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An extensible framework of key resource and transaction manager events to provide native support for foreign-initiated transactions, the framework providing a method comprising the steps of:

a resource manager receiving a personality module that maps a plurality of events that occur within said resource manager to a plurality of actions to be performed by said resource manager, wherein said plurality of actions are the actions required by a protocol for a particular type of foreign-initiated transaction;

in response to a transaction event that occurs in said resource manager, performing the steps of:
determining the transaction type of the transaction associated with the transaction event; and
if the transaction type of the transaction is said particular type of foreign-initiated transaction, then said resource manager performing an action that is mapped to said transaction event by said personality module.

2. The method of claim 1 further comprising the steps of:
said resource manager receiving a second personality module that maps said plurality of events that occur within said resource manager to a second plurality of actions to be performed by said resource manager, wherein said plurality of actions are the actions required by a second protocol for a second type of foreign-initiated transaction; and
if the transaction type of the transaction is said second type of foreign-initiated transaction, then said resource manager performing an action that is mapped to said transaction event by said second personality module.

3. The method of claim 1 wherein the step of performing an action includes making a call to a native routine of said resource manager.

4. The method of claim 1 wherein:
said personality module is one of a plurality of personality modules that are registered with said resource manager; and
the method further includes the step of performing the actions that are mapped to an internal resource manager event in each of said plurality of personality modules in response to the occurrence of said internal resource manager event.

5. The method of claim 1 wherein:
said personality module includes a plurality of routines which, when executed by said resource manager, perform said plurality of actions; and
the step of performing an action that is mapped to said transaction event by said personality module is performed by said resource manager calling one of said plurality of routines.

6. The method of claim 1 wherein the step of performing an action includes making a call to a foreign transaction manager.

7. A method for enabling a resource manager to support a plurality of foreign transaction types, the method comprising the steps of:
registering with the resource manager a personality module for each foreign transaction type of said plurality of foreign transaction types;
while the resource manager is executing a transaction that corresponds to a particular type of foreign transaction, performing the steps of:
selecting the personality module associated with said particular type of foreign transaction; and
causing said resource manager to perform actions indicated in said selected personality module in response to events that occur within said resource manager associated with said transaction.

8. The method of claim 7 further comprising the steps of:
detecting an event associated with said resource manager; and
in response to said event associated with said resource manager, performing actions mapped to said event in each personality module of said plurality of personality modules.

9. The method of claim 7 wherein the step of registering with the resource manager a personality module for each foreign transaction type of said plurality of foreign transaction types includes the step of providing to said personality module a set of routines for each foreign transaction type, wherein the set of routines for each given foreign transaction type include routines which, when executed, perform the actions required by a protocol associated with the given foreign transaction type.

10. A computer-readable medium carrying one or more sequences of instructions for enabling a resource manager to provide native support for foreign-initiated transactions, wherein execution of the one or more sequences of instructions by one or more processors causes the one or more processors to perform the steps of:
said resource manager receiving a personality module that maps a plurality of events that occur within said resource manager to a plurality of actions to be performed by said resource manager, wherein said plurality of actions are the actions required by a protocol for a particular type of foreign-initiated transaction;
in response to a transaction event that occurs in said resource manager, performing the steps of:
determining the transaction type of the transaction associated with the transaction event; and
if the transaction type of the transaction is said particular type of foreign-initiated transaction, then said resource manager performing an action that is mapped to said transaction event by said personality module.

11. The computer-readable medium of claim 10 further comprising instructions for performing the steps of:
said resource manager receiving a second personality module that maps said plurality of events that occur within said resource manager to a second plurality of actions to be performed by said resource manager, wherein said second plurality of actions are the actions required by a second protocol for a second type of foreign-initiated transaction; and
if the transaction type of the transaction is said second type of foreign-initiated transaction, then said resource manager performing an action that is mapped to said transaction event by said second personality module.

12. The computer-readable medium of claim 10 wherein the step of performing an action includes making a call to a native routine of said resource manager.

13. The computer-readable medium of claim 10 wherein:
said personality module is one of a plurality of personality modules that are registered with said resource manager; and
the computer-readable medium further includes instructions for performing the step of performing the actions that are mapped to an internal resource manager event in each of said plurality of personality modules in response to the occurrence of said internal resource manager event.

14. The computer-readable medium of claim 10 wherein:
said personality module includes a plurality of routines which, when executed by said resource manager, perform said plurality of actions; and
the step of performing an action that is mapped to said transaction event by said personality module is performed by said resource manager calling one of said plurality of routines.

15. The computer-readable medium of claim 10 wherein the step of performing an action includes making a call to a foreign transaction manager.

16. A computer-readable medium carrying instructions for enabling a resource manager to support a plurality of foreign transaction types, the computer-readable medium comprising instructions for performing the steps of:
registering with the resource manager a personality module for each foreign transaction type of said plurality of foreign transaction types;
while the resource manager is executing a transaction that corresponds to a particular type of foreign transaction, performing the steps of:
selecting the personality module associated with said particular type of foreign transaction; and
causing said resource manager to perform actions indicated in said selected personality module in response to events occurring within said resource manager associated with said transaction.

17. The computer-readable medium of claim 16 further comprising instructions for performing the steps of:
detecting an event associated with said resource manager; and in response to said event associated with said resource manager, performing actions mapped to said event in each personality module of said plurality of personality modules.

18. The computer-readable medium of claim 16 wherein the step of registering with the resource manager a personality module for each foreign transaction type of said plurality of foreign transaction types includes the step of providing to said personality module a set of routines for each foreign transaction type, wherein the set of routines for each given foreign transaction type include routines which, when executed, perform the actions required by a protocol associated with the given foreign transaction type.

* * * * *